(12) United States Patent
Liu

(10) Patent No.: US 7,745,743 B2
(45) Date of Patent: Jun. 29, 2010

(54) METHOD AND DEVICE FOR CONTROLLING SWITCH BETWEEN APPLIANCES

(75) Inventor: Chen Liu, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 146 days.

(21) Appl. No.: 11/638,029

(22) Filed: Dec. 13, 2006

(65) Prior Publication Data

US 2007/0171026 A1     Jul. 26, 2007

(30) Foreign Application Priority Data

Jan. 11, 2006     (CN) .................. 2006 1 0032919

(51) Int. Cl.
*H01H 9/00*     (2006.01)
(52) U.S. Cl. .............. 200/5 R; 200/4; 200/341; 348/734; 345/169
(58) Field of Classification Search .......... 200/5 R, 200/4, 341; 323/371; 348/14.05, 734; 345/169; 340/825.73

See application file for complete search history.

(56) References Cited

U.S. PATENT DOCUMENTS

| 2001/0045819 A1 | 11/2001 | Harris et al. |
| 2002/0044199 A1 | 4/2002 | Barzebar et al. |
| 2002/0053981 A1 | 5/2002 | Van Ryzin |
| 2004/0066377 A1* | 4/2004 | Ha .............................. 345/169 |
| 2005/0055108 A1 | 3/2005 | Gonzales et al. |
| 2005/0055472 A1 | 3/2005 | Krzyzanowski et al. |
| 2006/0066716 A1* | 3/2006 | Chang ...................... 348/14.05 |
| 2006/0279430 A1* | 12/2006 | Arai ...................... 340/825.73 |

FOREIGN PATENT DOCUMENTS

| CN | 1523827 | 8/2004 |
| CN | 1753046 | 3/2006 |
| JP | 07-288874 | 10/1995 |
| WO | WO2005/015943 | 2/2005 |

OTHER PUBLICATIONS

European Search Report dated Jun. 20, 2008 Application No./Patent No. 06791241.0-1244/1848155 PCT/CN2006002667.

\* cited by examiner

*Primary Examiner*—Kyung Lee

(57) ABSTRACT

This invention provides a method and a device for controlling switch between appliances. The method includes: setting a group of control signals according to operations to be performed by appliances involved in a switch between a current appliance and a target appliance; and controlling the appliances involved in the switch between the current appliance and the target appliance to perform operations corresponding to the group of control signals, when the switch is triggered. The method simplifies the operation of switch between appliances in a multi-appliance environment and enables one appliance switching key to control multiple appliances.

13 Claims, 2 Drawing Sheets

METHOD AND DEVICE FOR CONTROLLING SWITCH BETWEEN APPLIANCES

FIELD OF THE INVENTION

The present invention relates to control technologies, and particularly to a method and a device for controlling switch between appliances.

BACKGROUND OF THE INVENTION

The development of electronic technology, network technology and the like has brought families more and more electronic consuming products. Among these household appliances, audio/video related electric appliances alone are too numerous to be listed, such as color TV, audio device, digital camera, digital virtual disc (DVD), set-top box and so on. In addition, the digital media adapter (DMA) has realized the connection and communication between conventional household electronic appliances and computers. It is foreseeable that appliance networks consist of various electric appliances in digitized families in the future will be more complicated and the same is true for the office environment and industrial environment.

However, while meeting the demands, diversification of the products has brought such technical problem as how to control various electric appliances in the same environment. The conventional mode for multi-appliance control is providing a remote controller for each appliance. When controlling an appliance, first select a remote controller corresponding to the appliance, and realize the desired control functions by using control buttons on the control panel of the remote controller. Disadvantage of such a control mode is obvious. With a "multi-appliance remote controller" designed through improvement, functions of a plurality of remote controllers are combined, that is, some universal function keys are reused and appliance switching keys are used to realize the switch among the controlled appliances.

As shown in FIG. 1, the main difference between a multi-appliance remote controller and a conventional remote controller controlling a single appliance is that the multi-appliance remote controller has appliance switching keys, such as keys denoted by "appliance 1", "appliance 2", "appliance 3" and "appliance 4" in FIG. 1. These appliance keys are used to realize the switch between the controlled appliances. Suppose appliance 1 is a TV, appliance 2 is a DVD player, appliance 3 is a set-top box (STB) and appliance 4 is a standby appliance or another appliance.

Suppose an output signal of the STB is received by an AV1 input of the TV and an output signal of the DVD player is received by an AV2 input of the TV, when a user is watching digital TV and controlling the relevant operations using STB, the current appliance controlled by the multi-appliance remote controller is appliance 3 (STB). In this case, if the user wants to play a DVD disk, the operations needed to fulfill the switch from the current appliance STB to the target appliance DVD is as follows. The user first presses the appliance switching key "appliance 1" on the control panel of the multi-appliance remote controller to switch the current control appliance STB to an intermediate appliance, i.e. the TV, presses the key AV2 on the control panel of the remote controller to switch the AV1 mode to the AV2 mode, presses the appliance switching key "appliance 2" on the control panel of the multi-appliance remote controller to switch the current control appliance TV to the target appliance DVD player, and uses suitable function keys on the multi-appliance remote controller to implement functions such as DVD turning on, disk loading, disk reading, etc.

According to the foregoing control process, multiple operations of appliance switching keys are needed to control the switch between appliances by using the multi-appliance remote controller, and corresponding function controls are needed for related appliances, such as the current appliance, the intermediate appliance and the target appliance, thus such switch process is prone to errors and incorrect operations.

SUMMARY OF THE INVENTION

According to embodiments of the present invention, a method and a device are provided for controlling switch between appliances to solve such a problem that the operation of the multi-appliance remote controller is complex in a switch process.

The method for controlling switch between appliances in accordance with an embodiment of the invention includes:

setting a group of control signals according to operations to be performed by appliances involved in a switch between a current appliance and a target appliance; and controlling appliances involved in a switch between a current appliance and a target appliance to perform the operations corresponding to a group of control signals, when the switch is triggered; wherein the group of control signals are set according to the operations to be performed by the appliances involved in the switch between the current appliance and the target appliance.

In another embodiment of the present invention, a device for controlling switch between appliances may include an appliance switching key corresponding to a target appliance, adapted to provide a group of control signals according to operations to be performed by appliances involved in a switch between a current appliance and the target appliance, send the group of control signals to the appliances involved in the switch and control the appliances involved in the switch to perform operations corresponding to the group of control signals when the switch is triggered.

According to embodiments of the present invention, a method for defining the key of the control device based on a combinational mode of controlling multiple appliances using one key and a device for controlling the switch between appliances are provided. In consideration of the functions performed by the appliances related to the switch in the switch process, a group of control signals is defined for the appliance switching key. When desiring to switch the current controlled appliance to a target appliance, the user needs to press the appliance switching key, the control device will send the control signals to the relevant appliances and these relevant appliances will perform the relevant functions simultaneously.

The technical scheme provided according to embodiments of the present invention greatly simplifies the operation procedure of switch between appliances in a multi-appliance environment to thereby reduce the probability of incorrect manipulations.

DETAILED DESCRIPTION OF THE INVENTION

The present invention will be hereinafter described in detail with reference to the accompanying drawings and preferred embodiments.

Figure 1:
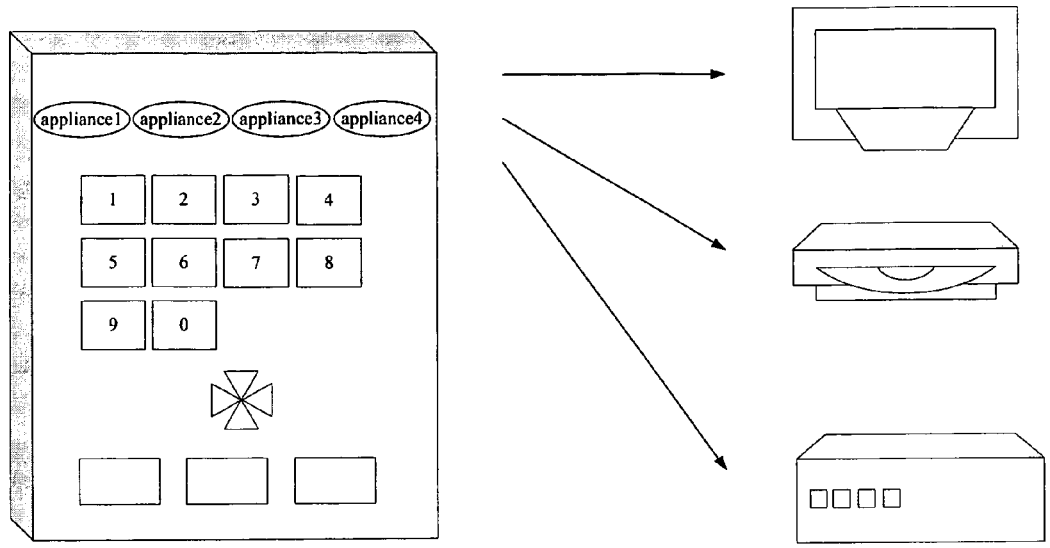
FIG. 1 is a schematic diagram illustrating the control panel of a multi-appliance remote controller according to the prior art.
Figure 2:
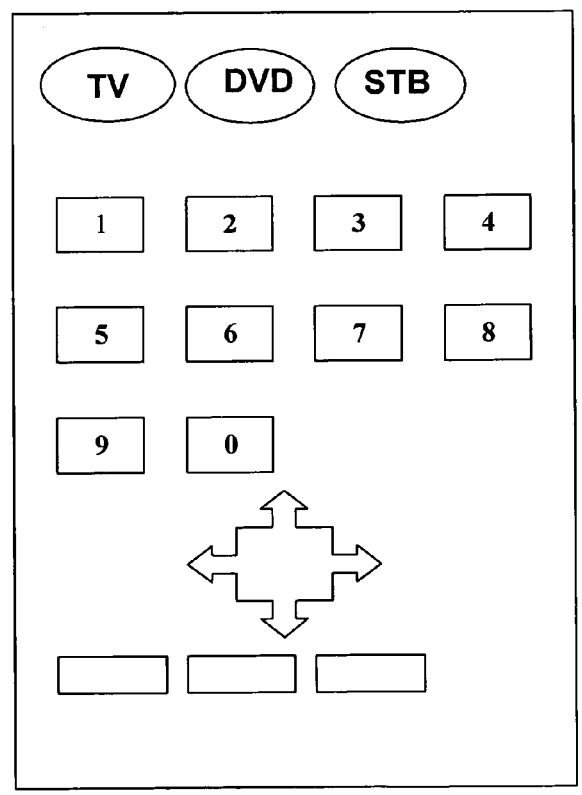
FIG. 2 is a schematic diagram illustrating the control panel of a remote controller according to an embodiment of the present invention.

As shown in FIG. 2, in an embodiment, corresponding appliance switching keys are set on the control panel of a remote controller according to the number of the appliances controlled by the remote controller. In FIG. 2, a controlled appliance corresponding to the "TV" key is a TV, a controlled appliance corresponding to "DVD" key is a DVD player, and a controlled appliance corresponding to "STB" key is a set-top box. In this embodiment, any one of the appliance switching keys can control multiple appliances in a combinational mode.

In accordance with the embodiment of the present invention, the functions of the appliance switching keys may be defined. That is, set a group of codes for each appliance switching key. When this appliance switching key is pressed, the remote controller modulates and sends the codes of the appliance switching key as infrared signals. Upon respectively identifying and receiving respective infrared signals, the corresponding current appliance, intermediate appliance and target appliance obtain the codes and decode the codes, and perform appropriate operations according to the signals obtained by decoding process. As such, each appliance switching key is defined to send a group of control signals. When desiring to switch to an appliance, a user may press an appliance switching key corresponding to the appliance, and the remote controller orderly sends the control signals to the current appliance, the intermediate appliance and the target appliance related to the switch process according to the above-mentioned definition to control these relevant appliances to implement the functions needed for the switch process.

In an embodiment of the invention, the relevant appliances involved in a switch process may include a current appliance, an intermediate appliance and a target appliance. In other embodiments of the invention, the number of the intermediate appliances may be zero, one or more. In this embodiment, the remote controller controls three appliances, thus at most one intermediate appliance is included.

In order to make each appliance switching key of the remote controller control multiple appliances, each appliance switching key may be defined individually. For example, when DVD function is required, the functions of the appliance switching key DVD to be performed by the appliances related to this switch process may include followings. The TV may be switched to the AV2 mode. The remote controller may enable functions as the DVD control and the DVD power-on. A control signal may be defined for the appliance switching key according to the function to be performed by such intermediate appliance as the TV, and another control signal may be defined for the appliance switching key according to the function to be performed by such target appliance as the DVD player. Similarly, appliance switching keys STB and TV may be defined.

Figure 3:
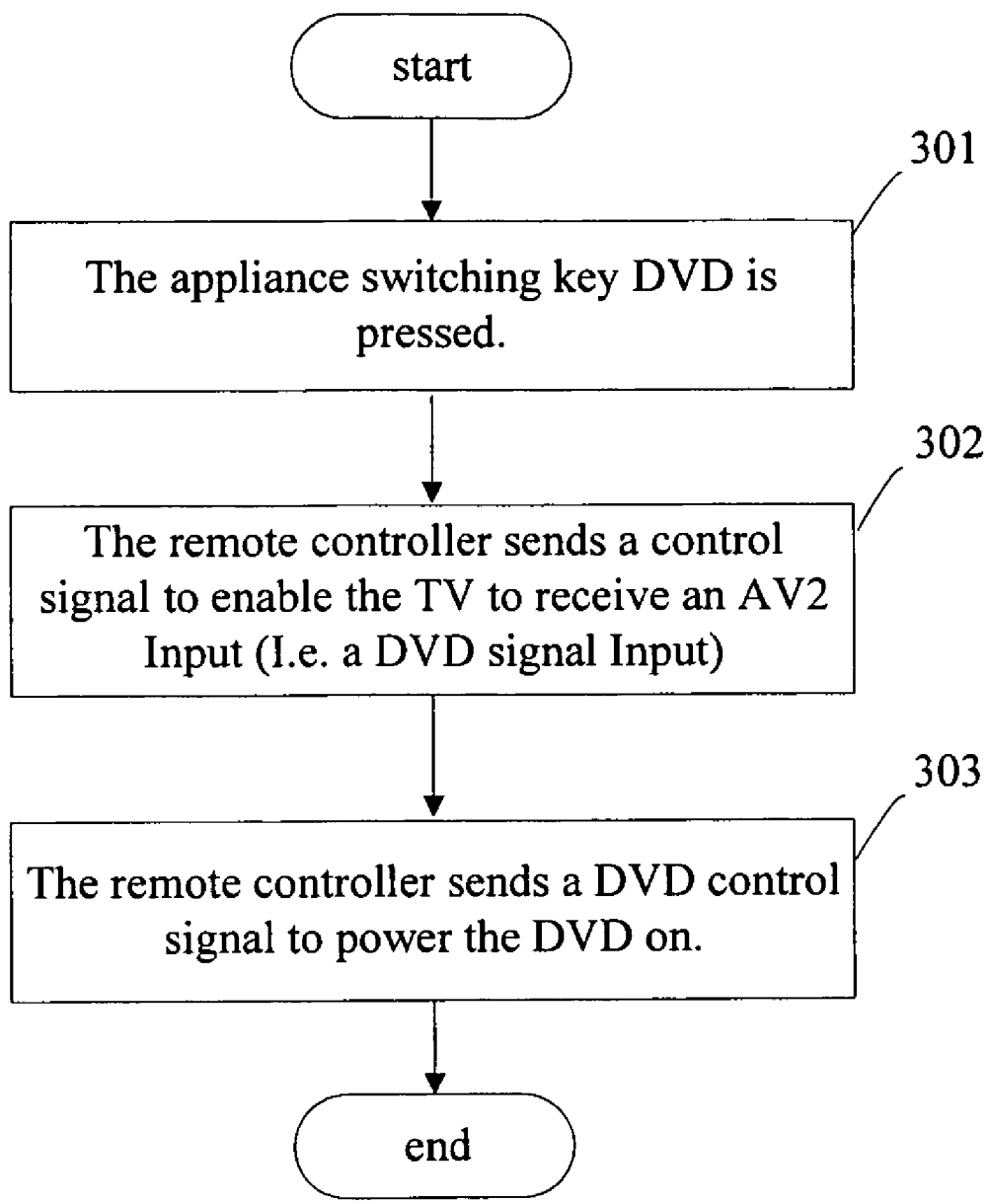
FIG. 3 is a flowchart illustrating a method for switch between appliances according to an embodiment of the present invention.

A remote controller using the foregoing method is shown in FIG. 2. Any one of the appliance switching keys such as "TV", "DVD" and "STB" can control multiple appliances, while other digital keys and function keys are similar as those of a conventional remote controller. In an embodiment of the invention, as shown in FIG. 3, the implementation of switching from the TV to the DVD may include these steps.

Step 301, the appliance switching key DVD is pressed.

Assume that the TV is broadcasting a digital TV program after a user made an appropriate operation on STB by the remote controller, when the user desires to play a video disc on DVD, the appliance switching key DVD should be pressed, since the target appliance is the DVD player and the corresponding appliance switching key should be selected according to the target appliance.

Steps 302~303, the remote controller sends a control signal to enable the TV to receive an AV2 Input (I.e. a DVD signal Input), and sends a DVD control signal to power the DVD on.

When the appliance switching key DVD is pressed, the remote controller sends an AV2 switch signal to the intermediate appliance TV, enables the DVD control of the remote controller, and sends to the target appliance DVD player a power-on signal. If the TV is currently in a TV mode, the TV receives the AV2 switch signal and switches from the TV mode to the AV2 mode, and the DVD player receives the power-on signal and turns on. Note that, the step of the TV receiving the AV2 switch signal and switching from the TV mode to the AV2 mode is not necessary if the TV is currently in the AV2 mode. As such, the entire control process is implemented by one appliance switching key, and the user may control the DVD player via other function keys on the remote controller to play a disc and images may be shown on TV after the image signals are received by the AV2 port of the TV and are processed. The processes for controlling other target appliances are similar as above described processes, that is, the user may press the appliance switching key corresponding to the desired target appliance and all operations of switch may be implemented, thereby implementing the function of controlling multiple appliances by one appliance switching key.

In the embodiment of the present invention, the interval between sending different control signals may be extremely short so that the user can hardly detect. Therefore, for the user, multiple control processes may be implemented just by pressing one appliance switching key and the usage is simple. Furthermore, in another embodiment of the invention, the control result of each relevant appliance may be simultaneously shown on the TV in the control process. For instance, in terms of the above embodiment, two control results "TV-to-AV2 switch" and "DVD power on" may be shown on the TV simultaneously. According to these control results, the user may determine whether the control process is implemented and perform the subsequent operations.

In this embodiment, three appliances, TV, DVD player and STD, are controlled by the remote controller. However, more than three appliances also may be controlled in other embodiments of the invention. In addition, in other embodiments of the invention, the remote controller also may be a multi-appliance remote controller in other application environments, such as office environment and industrial environment. For controlling multiple appliances, the control device may not use a remote controller, and a control panel fixed at an appliance according to the invention is also covered by the scope of the invention.

Generally, when using a remote controller to control multiple appliances in a family network, the user may pay attention to an output terminal of the controlled appliance. For example, when a user wants to watch digital TV program or DVD, the appliance to be controlled is the STB of the digital TV or the DVD player. However, the user usually pays attention to the terminal, i.e. the TV. Therefore, if the functions of the STB or the DVD desired by the user are not implemented by the TV, the user may be at loose ends. So, in the preferred embodiments of the invention, the control of the functions of each appliance switching key may be displayed or reflected on the output terminal of the target appliance when defining the appliance switching keys, such that the user may use the remote controller most easily and conveniently.

The foregoing are only preferred embodiments of the invention and are not for use in limiting the protection scope thereof. Any modification, equivalent replacement and improvement within the spirit and principle of this invention shall be covered in the scope defined by the appended claims.

What is claimed is:

1. A method for controlling switch between appliances, comprising:
    defining functions of the appliance switching keys each of which corresponds to one controlled appliance;
    detecting whether one appliance switching key is triggered;
    sending a group of control signals to appliances involved in a switch between a current appliance and a target appliance and switching current appliance control to target appliance control when detecting that the appliance switching key is triggered;
    wherein the group of control signals are configured to control the appliances involved in the switch to implement functions needed in the switch; and
    enabling the target appliance control of the remote controller.

2. The method of claim 1, wherein the appliances involved in the switch between the current appliance and the target appliance comprises the current appliance, at least one intermediate appliance and the target appliance.

3. The method of claim 2, further comprising:
    displaying state of implementing the functions by the appliances involved in the switch according to the group of control signals.

4. A device for controlling switch between appliances, configured to implement the method comprising:
    defining functions of the appliance switching keys each of which corresponds to one controlled appliance;
    detecting whether one appliance switching key is triggered;
    sending a group of control signals to appliances involved in a switch between a current appliance and a target appliance and switch current appliance control to target appliance control when detecting that the appliance switching key is triggered; wherein the group of control signals are configured to control the appliances involved in the switch to implement functions needed in the switch; and
    enabling the target appliance control of the remote controller.

5. The device of claim 4, wherein the device is any one selected from the group consisting of a remote controller and a control panel fixed in the controlled appliance.

6. The device of claim 4, wherein the appliances involved in the switch comprises the current appliance, at least one intermediate appliance and the target appliance.

7. The device of claim 6, wherein the number of the intermediate appliance is more than one.

8. The method of claim 2, wherein sending the group of control signals to the appliances comprises:
    sending a switch signal to the intermediate appliance enabling the intermediate appliance to work in a target appliance mode; and
    sending a power-on signal to the target appliance to start the target appliance.

9. The device of claim 6, wherein the device is further configured to
    send a switch signal to the intermediate appliance enabling the intermediate appliance to work in a target appliance mode; and
    send a power-on signal to the target appliance to start the target appliance when detecting that the appliance switching key is triggered.

10. A system for controlling switch between appliances, comprising:
    a remote controller and appliances involved in a switch between a current appliance and a target appliance; wherein the remote controller is configured to implement a method of
    defining functions of the appliance switching keys each of which corresponds to one controlled appliance;
    detecting whether one appliance switching key is triggered;
    sending a group of control signals to the appliances involved in the switch between the current appliance and the target appliance and switch current appliance control to target appliance control when detecting that the appliance switching key is triggered; wherein
    the group of control signals are configured to control the appliances involved in the switch to implement functions needed in the switch, and
    the appliances involved in the switch between the current appliance and the target appliance are further configured to receive the group of control signals and implement the functions needed in the switch under the control of the group of control signals; and
    enabling the target appliance control of the remote controller.

11. The device of claim 10, wherein the appliances involved in the switch between the current appliance and the target appliance comprises the current appliance, at least one intermediate appliance and the target appliance.

12. The device of claim 10, wherein one of the appliances involved in the switch is further configured to display control result of the appliances involved in the switch simultaneously.

13. The device of claim 11, wherein the remote controller is further configured to
    send a switch signal to the intermediate appliance enabling the intermediate appliance to work in a target appliance mode; and
    send a power-on signal to the target appliance to start the target appliance when detecting that the appliance switching key is triggered.

* * * * *